UNITED STATES PATENT OFFICE.

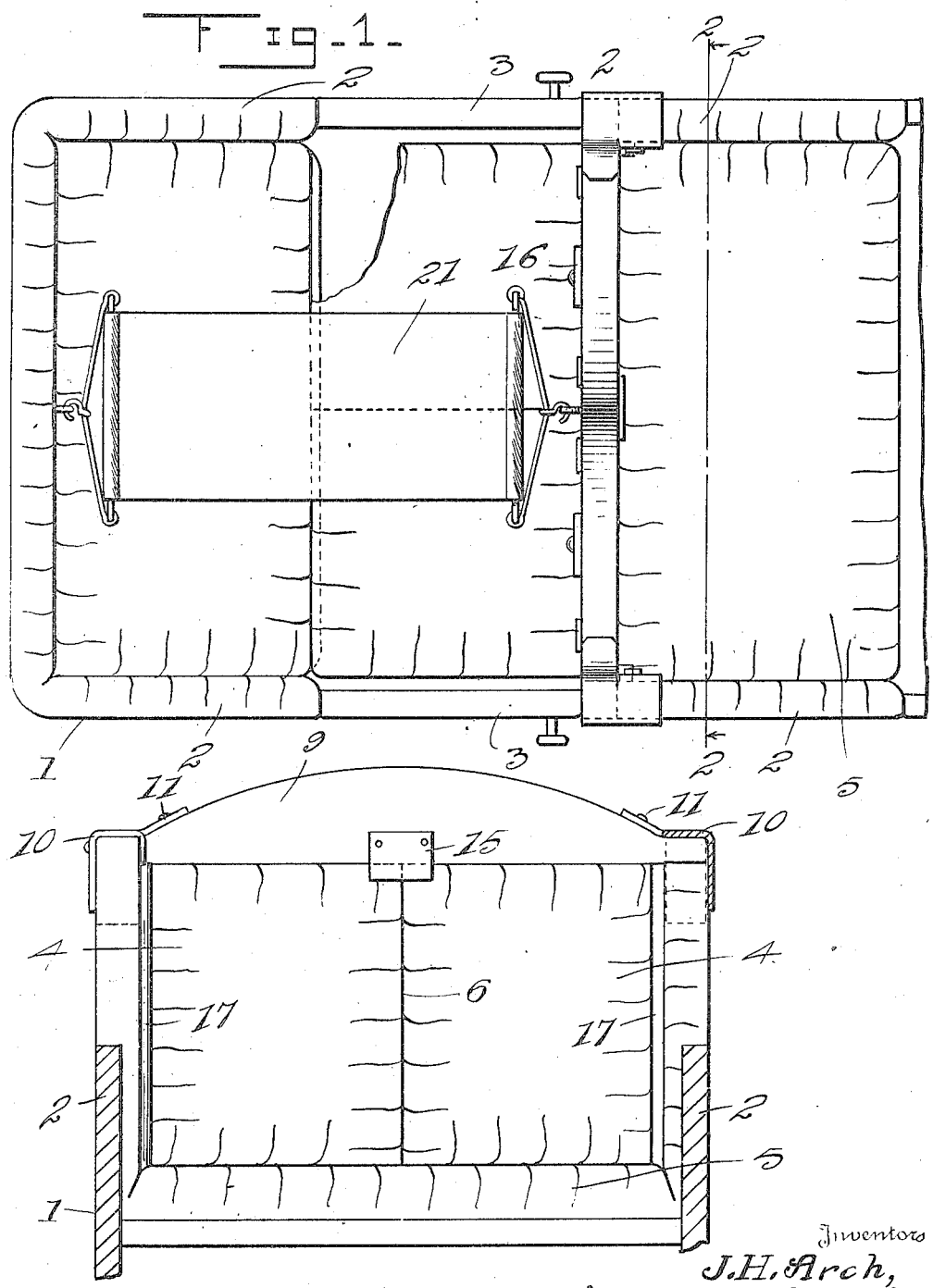

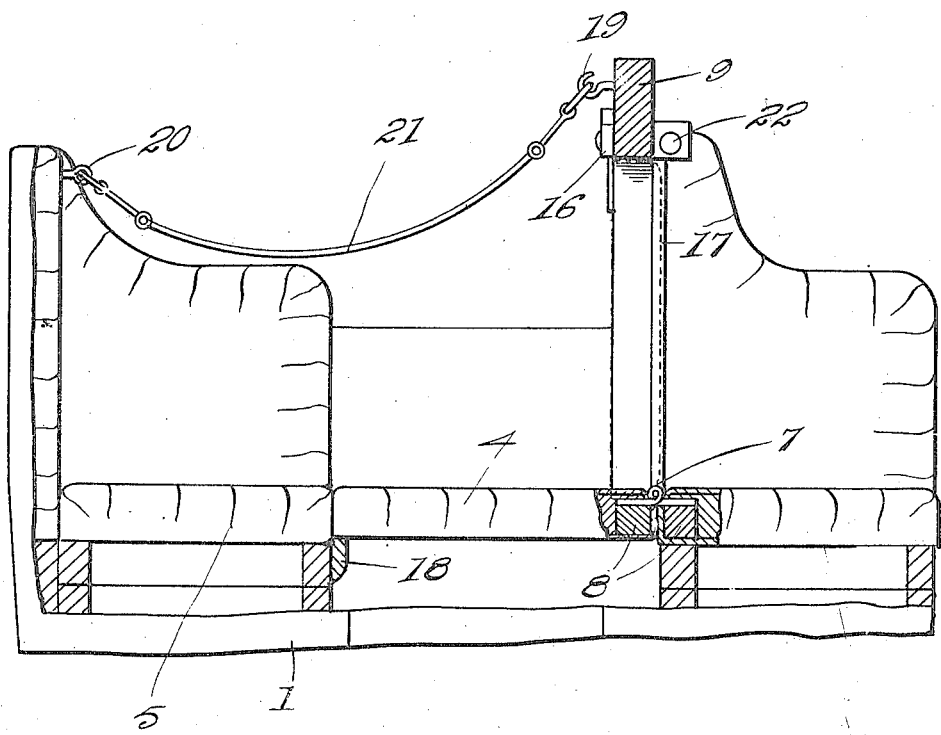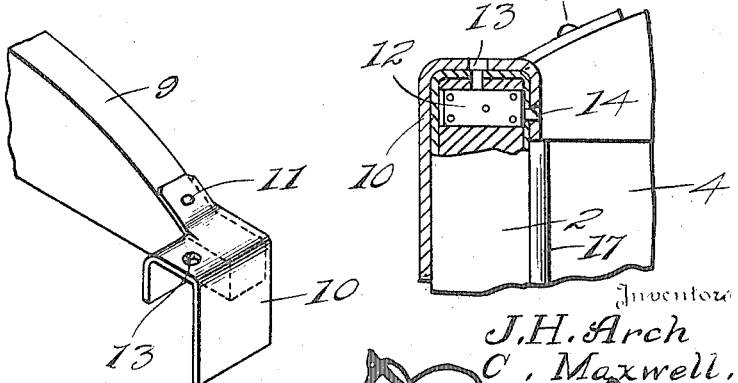

JOHN H. ARCH AND CLARENCE MAXWELL, OF OAKWOOD, OKLAHOMA.

COMBINED SEAT AND COUCH FOR AUTOVEHICLES.

1,181,055.  Specification of Letters Patent.  Patented Apr. 25, 1916.

Application filed March 6, 1915. Serial No. 12,689.

*To all whom it may concern:*

Be it known that we, JOHN H. ARCH and CLARENCE MAXWELL, citizens of the United States, residing at Oakwood, in the county of Dewey and State of Oklahoma, have invented certain new and useful Improvements in Combined Seats and Couches for Autovehicles; and we do hereby declare the following to be a full, clear, and exact description of the invention, such as will enable others skilled in the art to which it appertains to make and use the same.

This invention relates to combined seats and couches for automobiles, and one of the principal objects of the invention is to provide means for readily converting the back of the front seat and the front and back seats into a couch or bed.

Another object of the invention is to provide a readily convertible seat and couch or bed for automobiles, in which one half of the back of the front seat may be thrown down into horizontal position to rest on an extension or cleat on the back seat to form a couch for one side of the automobile while the opposite side may be used as an ordinary seat.

Still another object of the invention is to provide a combined convertible seat back and couch or bed for automobiles and provision being made for supporting a hammock above the bed for a child, said couch extending half way across the automobile and means being provided whereby the other half may be used as an ordinary seat, or may be converted into a bed.

The foregoing and other objects may be attained by means of the construction illustrated in the accompanying drawings, in which—

Figure 1 is a top plan view of a convertible seat and bed for automobiles made in accordance with this invention, and the backs of the front seats being folded backward to form a bed and a small hammock swung between the front and back seats. Fig. 2 is a vertical sectional view taken on the line 2—2 of Fig. 1 looking in the direction indicated by the arrows. Fig. 3 is a longitudinal sectional view. Fig. 4 is a detail perspective view of one end of the body support for the back of the seat, and Fig. 5 is a detail sectional view of a lock for holding the backs of the seats in position.

Referring to the drawing, the numeral 1 designates the body of an ordinary automobile, and 2 are the arms of the seats, and 3 are the side doors. The backs 4 of the front seats 5 are separated in the center as at 6, and both of the members 4 are separately hinged as at 7 to cross bars 8. The seats and backs are upholstered or padded in any suitable manner.

A body support 9 is connected to the top of the opposite arms by means of metal clips 10, said clips extending over upon opposite sides of the tops of the arms 2 and secured by suitable bolts or fastenings 11. A lock 12 is mounted in the arms 2, and a keyhole 13 formed in the clip 10 extends into the lock and may be available for a suitable key for withdrawing the bolt 14 whenever it is desired to remove the body support 9. In the center of the body support 9 is a metal stop 15 for the back 4 while at the back of the body portion 9 are turn buttons 16 for holding the backs 4 in vertical position against the cleats 17.

The back seat is provided with a transverse cleat 18 for supporting the back 4 when thrown down to form a couch or bed. Connected centrally to the body support 9 is a hook 19, and a similar hook 20 is connected to the back of the rear seat for supporting a hammock 21 to accommodate a child. The clips 10 may be held to the sides of the arms of the seat by means of a removable pin 22.

From the foregoing it will be obvious that the backs 4 of the front seats may be released by turning the buttons 16, and it will be understood that either or both of the back sections 4 may be swung down. If only one of the back sections 4 is swung down to rest upon the cleat 18, the driver's seat and one back is provided, if both back sections 4 are thrown down the body support 9 may be removed to provide a bed of sufficient width to accommodate two persons.

From the foregoing it will be obvious that a combined seat and bed made in accordance with this invention can be applied to any automobile or auto vehicle.

Various changes may be made in the details of construction without departing from the spirit and scope of the invention as defined in the claims.

What is claimed is:—

1. A combined seat and bed or couch for automobiles comprising a sectional back for the front seat, said sectional back being hinged at the bottom and adapted to be swung back and to rest upon a cleat in front of the back seat, a body support connected to the sides of the front seat and means for locking said body support in place and for permitting the removal thereof, said body support being adapted to have the front end of a hammock attached thereto when the back of the front seat is turned down.

2. A combined seat back and couch for automobiles, comprising a sectional front seat back hinged at its lower side to be thrown backward, a body support to which the seat sections may be connected when in upright position, said body support being removable, and locks for locking said support in position, said body support being adapted to have the front end of a hammock attached thereto when the back of the front seat is turned down.

3. A combined seat and couch for automobiles comprising a body support extending across and connected to the tops of the arms of the front seat, a sectional back for the front seat independently hinged and independently movable to a horizontal position to form a couch consisting of the front seat, the back seat and one section of the back of the front seat, and means for suspending a hammock from the body support and the back of the back seat above the couch.

In testimony whereof we affix our signatures in presence of two witnesses.

JOHN H. ARCH.
CLARENCE MAXWELL.

Witnesses:
FRANK B. NEIL,
CHAS. L. SMITH.